United States Patent Office 3,311,221
Patented Mar. 28, 1967

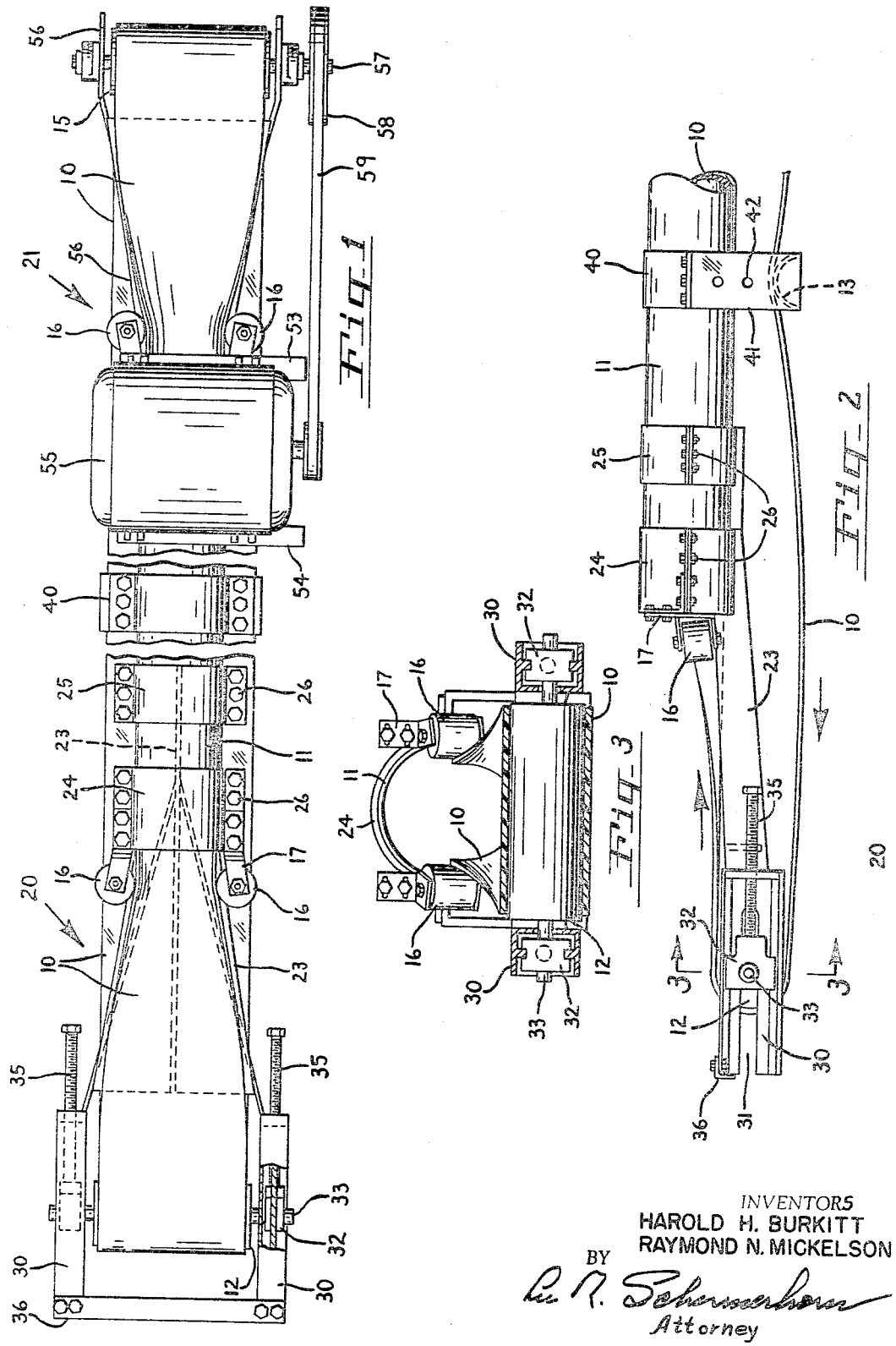

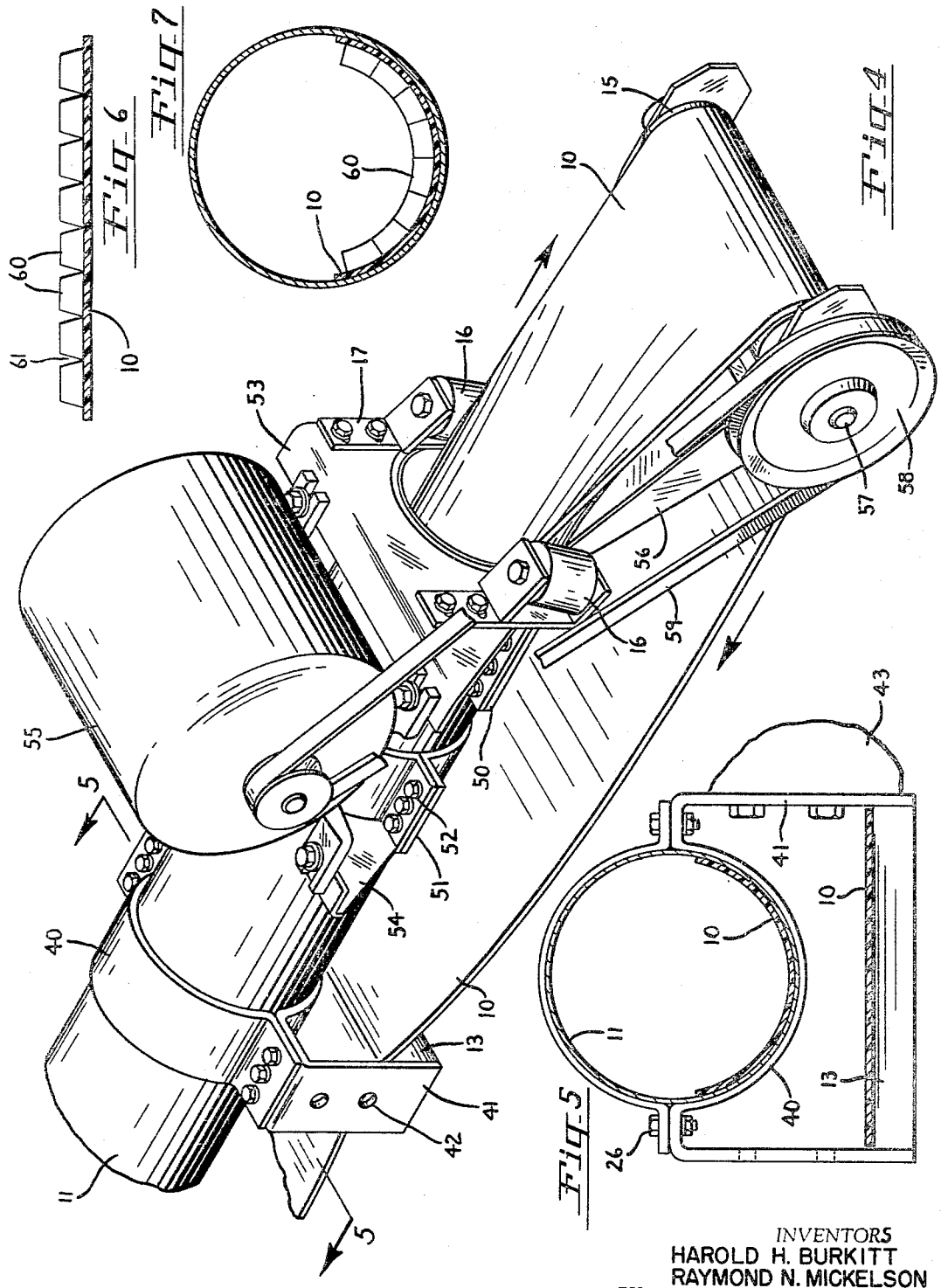

3,311,221
TUBE CONVEYOR
Harold H. Burkitt, Portland, and Raymond N. Mickelson, Milwaukie, Oreg., assignors to Plaslastic, Inc., Portland, Oreg., a corporation of Oregon
Filed Sept. 17, 1965, Ser. No. 488,012
3 Claims. (Cl. 198—191)

This invention relates to a belt conveyor in a tube.

There is a need, particularly in the food industry, for belt conveyors which will not contaminate foods and for conveyors which will run at high speeds without causing material to be lost from the conveyor by vibration, air friction or wind. Conventional rubber belts are generally not acceptable in the food industry because they contain a fabric reinforcement which is moisture absorbent and harbors bacteria. Such belts cannot be kept properly cleaned and free of bacteria.

Regardless of the material being carried, conventional belts are quite limited in speed and, when carrying very light material such as hops, the speed is even more limited because air resistance removes material from the belt as the speed increases. Also, in outdoor installations, there is problem from wind which blows material off the belt. These are problems are accentuated when it is desired to move material up an incline at relatively high speed. The advantages of high speed conveyance are considerable because with higher speed a small belt will do the work of a large belt, reducing the size and cost of the equipment and requiring less space for the apparatus.

Objects of the invention are, therefore, to provide an improved high speed conveyor, to provide a conveyor which will retain its burden of material while travelling at high speed, to provide a conveyor in which air resistance is substantially eliminated, to provide a conveyor which is enclosed and protected from the wind, to provide a conveyor having relatively low friction, to provide a conveyor which is acceptable in the food industry, to provide a conveyor which is free of moisture absorbing components and to provide an improved belt cleat for inclined travel.

The present conveyor comprises an inert, non-absorbent and low friction belt, such as nylon, running in a tube of inert and non-absorbent material such as plastic or stainless steel. Food juices or other liquids associated with conveyed products are not absorbed into either the belt or the tube and both are easy to wash and keep clean and free of bacteria.

Preferably, the tube comprises circular pipe and the belt is of sufficient width to occupy the lower half of the tube. In such an arrangement, the belt can travel at high speed with low friction and without losing any material off the belt. Troughing rollers at the entrance and exit ends trough the belt into semi-circular shape during its passage through the tube. Beyond the ends of the tube the belt is trained around cylindrical pulleys in flat configuration. A return reach of the belt under the tube is also flat. A special form of segmented cleat is provided for inclined runs whereby the cleat will accommodate itself to both the trough shape and the flat configuration of the belt.

The foregoing and other objects and advantages will become apparent and the invention will be better understood from the following description of the preferred embodiment illustrated in the accompanying drawings. Various changes may be made, however, in the details of construction and arrangement of parts and certain features may be used without others. All such modifications within the scope of the appended claims are included in the invention.

In the drawings:

FIGURE 1 is a top plan view of a tube conveyor, with parts broken away, embodying the principles of the invention;

FIGURE 2 is a side elevation view of the entrance end of the conveyor;

FIGURE 3 is a view on the line 3—3 in FIGURE 2;

FIGURE 4 is a perspective view showing the exit end of the conveyor;

FIGURE 5 is a view on the line 5—5 of FIGURE 4;

FIGURE 6 is a cross sectional view of the conveyor belt in flat configuration, showing a cleat for inclined travel; and FIGURE 7 is a view showing the belt and cleat of FIGURE 6 in troughed configuration in a tube.

The belt 10 is a flat nylon belt which has inherently low friction characteristics and which is without any absorbent reinforcement material such as the fabric webbing commonly used in conventional rubber belts. The upper reach of the belt which is utilized for conveyance purposes slides through the bottom of the tube 11 in trough shape. Preferably, the width of the belt is equal to approximately half the circumference of the tube whereby the belt assumes a substantially semi-circular configuration as shown. Tube 11 is preferably made of plastic or stainless steel whereby both belt and tube are made of relatively inert and substantially non-absorbent materials which are acceptable in the food industry.

At the entrance end of tube 11, the belt passes around a crowned idler pulley 12 from curved return shoes 13 beneath the tube as shown in FIGURE 2. At the exit end of the tube, the belt passes around a crowned drive pulley 15 and returns to the shoes 13 as shown in FIGURE 4. At both entrance and exit ends, the edge portions of the belt passes between pairs of inclined, nearly vertical, troughing rollers 16. The crown of pulleys 12 and 15 centers the belt and prevents it from climbing up the troughing rollers on one side or the other. These troughing rollers are carried by brackets 17 which are adjustably mounted on a head assembly 20 and a tail assembly 21.

Head assembly 20 is shown in FIGURES 1, 2 and 3. The head assembly comprises a longitudinal bracket 23 which is supported on the tube 11 by a pair of split collars 24 and 25 which are clamped on the tube by bolts 26. Troughing roller brackets 17 are bolted on the collar 24 as shown. The outer end of bracket 23 carries a pair of bearing supports 30 having horizontal slots 31 for the adjustment of bearing blocks 32 which carry the shaft 33 of idler pulley 12. Thus, the belt may be tightened by means of screws 35. Each support 30 is equipped with a stop 36 so that the bearing blocks 32 cannot be shifted beyond the end of the slots 31.

Tube 11 is provided at intervals with other split collars 40 having hanger brackets 41 to support the return shoes 13 as shown in FIGURES 2, 4 and 5. These brackets are provided with holes 42 for connection with suitable supports 43. Thus, the conveyor tube may be supported on floor pedestals, ceiling hangers or other suitable means, and head and tail assemblies 20 and 21 being in turn supported from the ends of tube 11.

Tail assembly 21 is shown in FIGURES 1 and 4. This assembly is supported by a pair of split collars 50 and 51 which are secured on the end of tube 11 by bolts 52. These collars have motor mounts 53 and 54 for the motor 55 and a longitudinally extending bracket 56 which carries bearings for the shaft 57 of belt pulley 15. Shaft 57 also carries a pulley 58 which is driven by the motor through a belt 60.

Material to be conveyed may be introduced onto the belt by a hopper or other suitable means, not shown. The material may be introduced onto the belt in the region of troughing rollers 16 in the head assembly 20 just outside the entrance to tube 11 or an opening or openings may be provided in the top of tube 11 at any desired point. Tube 11 not only protects the material on the conveyor from external winds and drafts which might dislodge the material but, also, forms a flue in which the moving belt and material induce a flow of air through the tube. This reduces the head resistance which the material would otherwise encounter in moving rapidly through still air whereby very light materials may be moved much faster. Also, if desired, an external flow of air from a blower may be introduced into the entrance end of tube 11 at approximately the same velocity as the belt whereby the material on the belt will encounter no head resistance at all. In this way very high conveyor speeds may be attained successfully even when handling very light and fluffy materials. It will be apparent in FIGURE 5 that transported material cannot escape from the belt.

FIGURES 6 and 7 illustrate a novel form of segmented cleat 60 for conveying material up an incline. The cleat 60 contains a plurality of V-notches 61 in its upper surface which close together and make a solid, continuous cleat when the belt is troughed within the tube. The notches permit the cleat to straighten out in passing around the end pulleys 12 and 15. When such cleats are employed, the return shoes 13 would be omitted and the return reach of the belt would be allowed to hang from the underside of drive pulley 15 which would be the upper pulley.

Having now described our invention and in what manner the same may be used, what we claim as new and desire to protect by Letters Patent is:

1. A conveyor comprising a tube, a tail asesmbly comprising collar means clamped on one end of said tube, a tail bracket on said collar maens extending beyond said end of said tube, a flat belt pulley mounted on said bracket, a belt on said pulley, said belt having an upper reach trained through said tube and arranged to slide in the bottom of said tube in trough shape and having a lower return reach underneath said tube, troughing rollers for said belt mounted on said collar means, a motor mount on said collar means on the upper side of said tube, a motor on said mount for driving said belt pulley, a head assembly comprising collar means clamped on the opposite end of said tube, troughing rollers for said belt mounted on said last collar means, a head bracket on said last collar means extending beyond said opposite end of said tube, and a flat idler pulley for said belt mounted on said head bracket.

2. A conveyor as defined in claim 1 including bearing blocks for said idler pulley, and means mounting said bearing blocks for sliding movement in said head bracket for tightening said belt.

3. A conveyor as defined in claim 1 including hanger bracket collar means clamped on said tube, belt return shoes on said hanger bracket collar means, and means on said hanger bracket collar means for supporting the conveyor.

References Cited by the Examiner
UNITED STATES PATENTS

| | | | |
|---|---|---|---|
| 874,982 | 12/1907 | Norton | 198—198 |
| 2,528,917 | 11/1950 | Slocum | 198—120.5 |
| 3,147,851 | 9/1964 | Dietrich | 198—198 |
| 3,212,628 | 10/1965 | Massey et al. | 198—204 X |

FOREIGN PATENTS

| | | |
|---|---|---|
| 810,482 | 9/1936 | France. |
| 1,038,262 | 5/1953 | France. |
| 1,187,759 | 3/1959 | France. |
| 1,358,636 | 3/1964 | France. |
| 1,375,744 | 9/1964 | France. |
| 958,549 | 2/1957 | Germany. |
| 887,698 | 1/1962 | Great Britain. |
| 566,324 | 8/1957 | Italy. |

References Cited by the Applicant
UNITED STATES PATENTS

| | | |
|---|---|---|
| 858,612 | 7/1907 | Mason. |
| 999,419 | 8/1911 | Van Wert. |
| 1,339,627 | 5/1920 | Schwartzkopf. |
| 1,427,553 | 8/1922 | Schwinger. |
| 2,360,257 | 10/1944 | Muller et al. |
| 2,645,343 | 4/1949 | Nemir. |
| 3,132,738 | 5/1964 | Engsteth. |

EVON C. BLUNK, *Primary Examiner.*

M. L. AJEMAN, *Assistant Examiner.*